US008666593B2

(12) United States Patent
Yamada

(10) Patent No.: US 8,666,593 B2
(45) Date of Patent: Mar. 4, 2014

(54) TRAVEL INFORMATION COLLECTION APPARATUS

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 767 days.

(21) Appl. No.: 12/148,805

(22) Filed: Apr. 22, 2008

(65) Prior Publication Data

US 2008/0269985 A1 Oct. 30, 2008

(30) Foreign Application Priority Data

Apr. 25, 1920 (JP) ................................ 2007-115572

(51) Int. Cl.
*G01C 21/00* (2006.01)

(52) U.S. Cl.
USPC ............ 701/36; 701/400; 701/408; 701/414; 701/424; 701/430; 701/465; 340/988

(58) Field of Classification Search
USPC .................................................. 340/988–996
See application file for complete search history.

(56) References Cited

U.S. PATENT DOCUMENTS

| | | | | |
|---|---|---|---|---|
| 5,521,823 | A | 5/1996 | Akita et al. | |
| 6,154,152 | A | 11/2000 | Ito | |
| 6,480,783 | B1 * | 11/2002 | Myr | 701/117 |
| 7,376,509 | B2 * | 5/2008 | Endo et al. | 701/423 |
| 7,454,442 | B2 * | 11/2008 | Cobleigh et al. | 1/1 |
| 7,706,964 | B2 * | 4/2010 | Horvitz et al. | 701/117 |
| 7,885,285 | B2 * | 2/2011 | Fukuyama | 370/428 |
| 7,912,628 | B2 * | 3/2011 | Chapman et al. | 701/117 |
| 7,912,635 | B2 * | 3/2011 | Yamane et al. | 701/414 |
| 8,014,936 | B2 * | 9/2011 | Chapman et al. | 701/117 |
| 2002/0040271 | A1 * | 4/2002 | Park et al. | 701/209 |
| 2003/0014181 | A1 * | 1/2003 | Myr | 701/117 |
| 2003/0023375 | A1 * | 1/2003 | Yoshida | 701/212 |
| 2003/0050742 | A1 * | 3/2003 | Sakamoto et al. | 701/1 |
| 2003/0135304 | A1 * | 7/2003 | Sroub et al. | 701/1 |
| 2004/0030670 | A1 * | 2/2004 | Barton | 707/1 |
| 2004/0054468 | A1 * | 3/2004 | Yamada et al. | 701/211 |
| 2004/0068525 | A1 * | 4/2004 | Yamazaki | 707/201 |
| 2004/0100460 | A1 * | 5/2004 | Yamada et al. | 345/204 |

(Continued)

FOREIGN PATENT DOCUMENTS

| | | |
|---|---|---|
| DE | 10 2005 01379 | 10/2005 |
| JP | 05-58199 | 3/1993 |

(Continued)

OTHER PUBLICATIONS

Office action dated Apr. 26, 2011 in corresponding Japanese Application No. 2007-115572.

(Continued)

*Primary Examiner* — Jonathan M Dager
(74) *Attorney, Agent, or Firm* — Harness, Dickey & Pierce, PLC

(57) ABSTRACT

Travel information is categorized into plural time slot categories according to information characteristics of traffic flow information that represents a traffic flow of each of road sections in a database of an information center, and a learn database is built for each of the categories derived from above categorization. The travel information collected by a travel of a self vehicle along the road sections is learned according to the categories of the learn database for accurately managing the travel information according to the characteristics of the traffic flow.

12 Claims, 5 Drawing Sheets

(56) References Cited

U.S. PATENT DOCUMENTS

| | | | | |
|---|---|---|---|---|
| 2004/0158389 | A1* | 8/2004 | Shibata et al. | 701/200 |
| 2004/0220728 | A1* | 11/2004 | Cayford | 701/209 |
| 2004/0249568 | A1* | 12/2004 | Endo et al. | 701/209 |
| 2005/0075119 | A1* | 4/2005 | Sheha et al. | 455/456.6 |
| 2005/0231394 | A1* | 10/2005 | Machii et al. | 340/995.13 |
| 2006/0178807 | A1* | 8/2006 | Kato et al. | 701/117 |
| 2006/0212217 | A1* | 9/2006 | Sheha et al. | 701/209 |
| 2007/0021886 | A1 | 1/2007 | Miyajima | |
| 2007/0087756 | A1 | 4/2007 | Hoffberg | |
| 2007/0118275 | A1* | 5/2007 | Qi et al. | 701/117 |
| 2007/0150185 | A1* | 6/2007 | Nagase et al. | 701/209 |
| 2008/0059057 | A1* | 3/2008 | Tengler et al. | 701/204 |
| 2008/0091339 | A1* | 4/2008 | Nagase et al. | 701/200 |

FOREIGN PATENT DOCUMENTS

| | | | |
|---|---|---|---|
| JP | 05-155273 | | 6/1993 |
| JP | 07-192194 | | 7/1995 |
| JP | 3022115 | B2 | 1/2000 |
| JP | 2004-157768 | | 6/2004 |
| JP | 2004-317160 | | 11/2004 |
| JP | 2005-035533 | | 2/2005 |
| JP | 2006-092159 | | 4/2006 |
| JP | 2006-163495 | | 6/2006 |
| JP | 2006-208155 | | 8/2006 |

OTHER PUBLICATIONS

Office action dated Nov. 1, 2011 in corresponding Japanese Application No. 2007-115572.

Office action dated Sep. 13, 2013 in corresponding German Application No. 102008020590.7.

* cited by examiner

| | WEEKDAY | | | HOLIDAY | | |
|---|---|---|---|---|---|---|
| RD 1 | 7−9 | OTHER | | 10−12 | OTHER | |
| RD 2 | 6−7 | 7−8 | OTHER | 10−12 | OTHER | |
| ⋮ | | | | | | |
| RD N | 8−9 | OTHER | | 9−10 | 10−12 | OTHER |

LINK (RD 1 … RD N)

| | WEEKDAY | | | | | | | | | HOLIDAY | |
|---|---|---|---|---|---|---|---|---|---|---|---|
| | 7−9 | | | | | | | | OTHER | 10−12 | OTHER |
| RD 1 | LESS A | −10 A | −5 A | STD B | +5 A | +10 A | MORE A | POS-REL E | | | |
| | STA-REL C | | | | | | | | | | |
| | COLLECTED AVG SPD D | | | | | | | | | | |
| RD 2 | | | | | | | | | | | |
| RD 3 | | | | | | | | | | | |
| RD 4 | | | | | | | | | | | |

FIG. 8A

<table>
<tr><td rowspan="5">RD 1</td><td colspan="8">WEEKDAY</td><td colspan="3">HOLIDAY</td></tr>
<tr><td colspan="8">7−9</td><td>OTHER</td><td>10−12</td><td>OTHER</td></tr>
<tr><td>LESS<br>0</td><td>−10<br>0</td><td>−5<br>0</td><td>STD<br>40</td><td>+5<br>1</td><td>+10<br>0</td><td>MORE<br>0</td><td rowspan="3">POS-REL<br>80</td><td rowspan="3"></td><td rowspan="3"></td><td rowspan="3"></td></tr>
<tr><td colspan="7">STA-REL 100</td></tr>
<tr><td colspan="7">COLLECTED AVG SPD 42</td></tr>
<tr><td>RD 2</td><td colspan="8"></td><td></td><td></td><td></td></tr>
<tr><td>RD 3</td><td colspan="8"></td><td></td><td></td><td></td></tr>
<tr><td>RD 4</td><td colspan="8"></td><td></td><td></td><td></td></tr>
</table>

FIG. 8B

<table>
<tr><td rowspan="5">RD 1</td><td colspan="8">WEEKDAY</td><td colspan="3">HOLIDAY</td></tr>
<tr><td colspan="8">7−9</td><td>OTHER</td><td>10−12</td><td>OTHER</td></tr>
<tr><td>LESS<br>0</td><td>−10<br>0</td><td>−5<br>1</td><td>STD<br>40</td><td>+5<br>3</td><td>+10<br>1</td><td>MORE<br>0</td><td rowspan="3">POS-REL<br>77</td><td rowspan="3"></td><td rowspan="3"></td><td rowspan="3"></td></tr>
<tr><td colspan="7">STA-REL 75</td></tr>
<tr><td colspan="7">COLLECTED AVG SPD 44</td></tr>
<tr><td>RD 2</td><td colspan="8"></td><td></td><td></td><td></td></tr>
<tr><td>RD 3</td><td colspan="8"></td><td></td><td></td><td></td></tr>
<tr><td>RD 4</td><td colspan="8"></td><td></td><td></td><td></td></tr>
</table>

TRAVEL INFORMATION COLLECTION APPARATUS

CROSS REFERENCE TO RELATED APPLICATION

The present application is based on and claims the benefit of priority of Japanese Patent Application No. 2007-115572 filed on Apr. 25, 2007, the disclosure of which is incorporated herein by reference.

FIELD OF THE INVENTION

The present disclosure generally relates to a travel information collection apparatus for use in a vehicle.

BACKGROUND INFORMATION

A technique for collecting, in a database, road information through various sensors in a vehicle to achieve a higher degree of drivability, economy, and safety based on collected road information in the database is disclosed in, for example, Japanese patent document No. 3022115.

The disclosure of the above patent document causes, while enabling an apparatus to be capable of controlling a vehicle control system in an accurate manner based on a utilization of road shape information that includes universal attributes of altitude, inclination, curvature and the like for setting a control target value of the vehicle control system, a problematic situation that the control of the vehicle control system can not be performed in the accurate manner due to susceptibility of vehicle information to an influence of a traffic flow when the vehicle information such as a vehicle speed, a power consumption amount, a fuel consumption amount is collected for setting the control target value of the vehicle control system.

SUMMARY OF THE INVENTION

In view of the above and other problems, the present invention provides a management method of travel information of a vehicle in an accurate manner.

A travel information collection apparatus of the present invention includes: a position detector capable of determining a current position of a self vehicle and a traveling road section; a storage control unit capable of storing, in a storage unit, travel information of the self vehicle collected for each of road sections along a travel of the self vehicle; a database building unit capable of building a learn database having plural time slot categories according to traffic information characteristics of traffic information that is stored in a traffic information database of an information center to represent a traffic flow of each of the road sections. The storage control unit controls collected travel information to be learned according to the categories of the learn database.

The above configuration of the travel information collection apparatus achieves an improvement of management accuracy of collected travel information due to database building that reflects plural time slot categories of traffic flow information characteristics of the database in the information center and categorization of the collected travel information in the database. The traffic flow information includes an average vehicle speed, a link travel time and the like.

Further, the present invention is characterized in that determining a current position of a self vehicle and a traveling road section; storing, to a storage unit, travel information of the self vehicle collected for each of road sections; building a learn database having plural time slot categories according to traffic information characteristics of traffic information that is stored in a traffic information database of an information center to represent a traffic flow of each of the road sections; and controlling the collected travel information to be learned according to categorization of the learn database.

The learn database structured according to the characteristics of traffic flow stored in the database of the information center in plural time slot categories, with the collected travel information stored therein based on the categories of the learn database, facilitates accurate management of the collected travel information.

BRIEF DESCRIPTION OF THE DRAWINGS

Other objects, features and advantages of the present invention will become more apparent from the following detailed description made with reference to the accompanying drawings, in which:

FIGS. 8A and 8B show diagrams showing data storage processing of the learning database.

DETAILED DESCRIPTION

Figure 1:
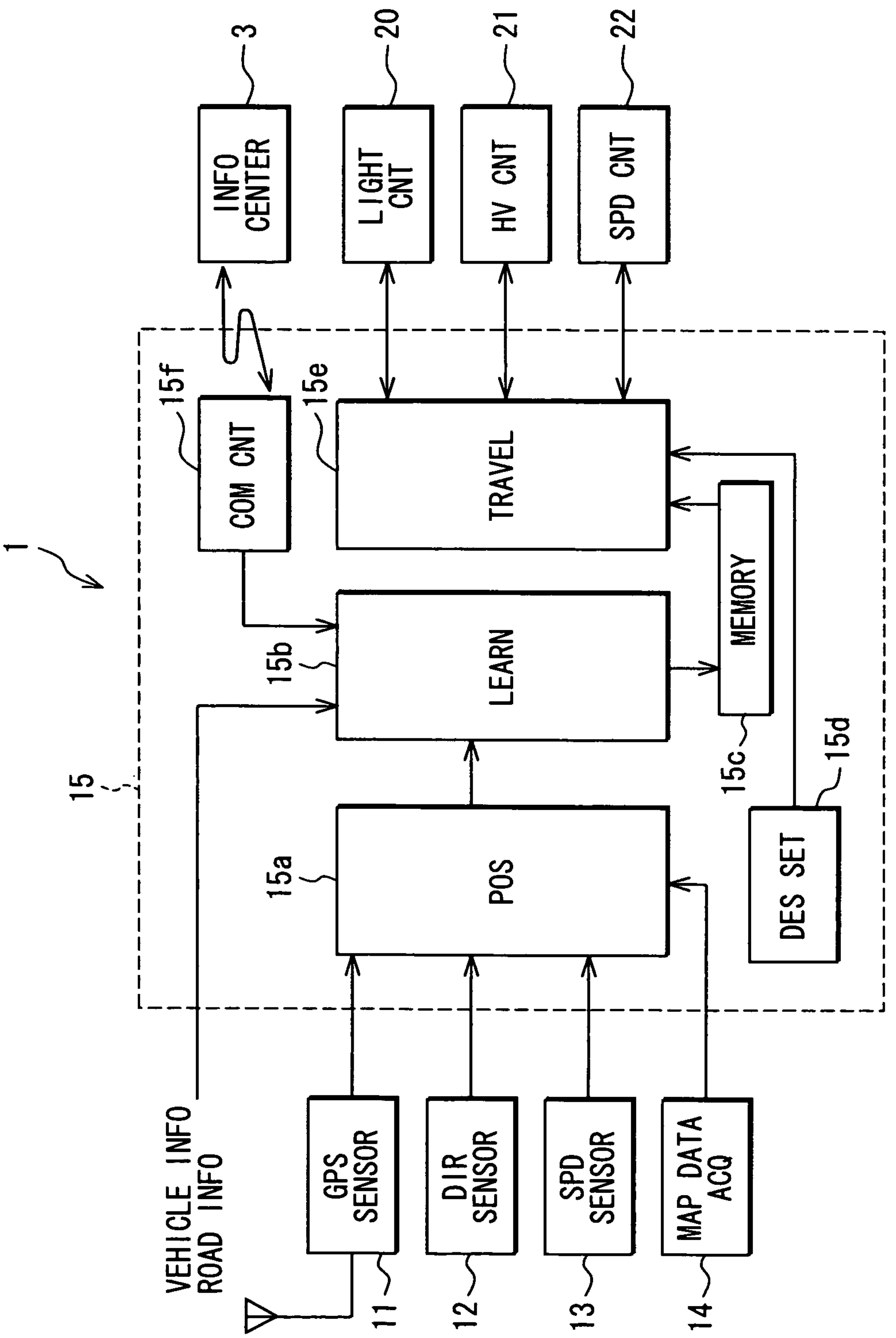
FIG. 1 shows a block diagram showing a constitution of a travel information collection apparatus in an embodiment of the present invention.

The configuration of a travel information collection apparatus 1 in an embodiment of the present invention is shown in FIG. 1. The travel information collection apparatus 1 is implemented as a navigation apparatus installed on a vehicle. In addition, the vehicle is a hybrid vehicle including a light control unit 20 to control the direction of the headlight according to a road shape of a road ahead, a hybrid control unit 21 to provide charging control and assisting control of the hybrid system, and a vehicle speed control unit 22 to control vehicle speed according to a road shape of a road ahead.

The travel information collection apparatus 1 has a GPS sensor 11, a direction sensor 12, a vehicle speed sensor 13, a map data acquisition unit 14 and a control unit 15.

The GPS sensor 11 receives a signal from the GPS satellite, and outputs information to pinpoint the current position of the self vehicle to the control unit 15. The information includes accuracy information called HDOP (Horizontal Dilution Precision) representing a fall of the accuracy in the horizontal direction due to the distribution state of the GPS satellites.

The direction sensor 12 sends out a signal showing the direction variate of the self vehicle to the control unit 15.

The vehicle speed sensor 13 sends out a vehicle speed signal according to the vehicle speed of the self vehicle to the control unit 15.

Figure 2A:
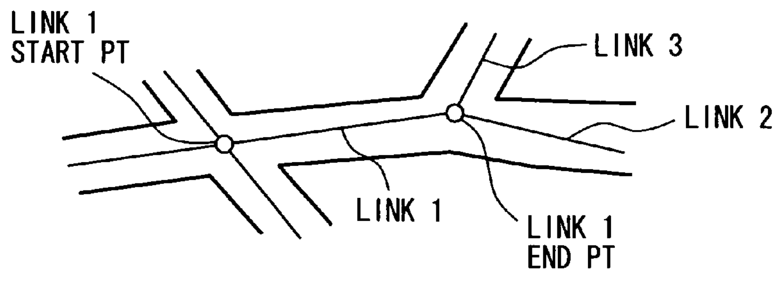
FIGS. 2A and 2B show illustrations of links and segments included in road map information.
Figure 2B:
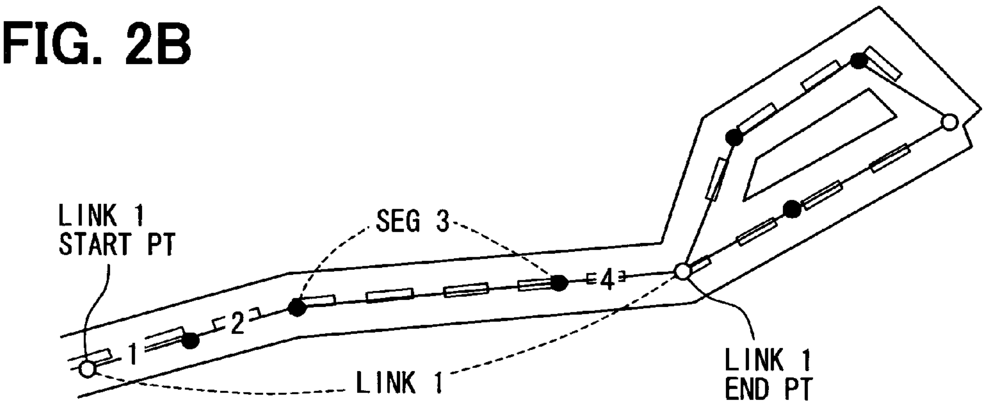

The map data acquisition unit 14 acquires map data from the map database which stores the map data of whole Japanese territory including road map information. Link information to represent a link connecting intersections is included in the road map information as shown in FIG. 2A. In addition, the center of the intersection is defined as a start and end point of a link. In addition, road identification information (link ID) and a road type such as a highway, a local road, and a narrow street are included in the link information. Further, a supplement shape point to show a road shape in the link is included in the road map information as shown in FIG. 2B, and the smallest unit of these supplement shape points is called as a segment.

The control unit 15 has a position standardization unit 15*a*, a learning control unit 15*b*, a storage medium 15*c*, a destination setting unit 15*d*, a travel support unit 15*e* and a communication control unit 15*f*.

The position standardization unit 15*a* calculates the relative position of the self vehicle based on signal inputs from the direction sensor 12 and the vehicle speed sensor 13, and calculates the absolute position of the self vehicle based on information from the GPS sensor 11. That is, based on both of the relative position of the self vehicle and the absolute position of the self vehicle, a position of the vehicle is identified. Furthermore, road identification information (link ID) and the road type of a road section being traveled by the self vehicle are identified by map matching technology, and a position of the self vehicle is corrected to a position on the road for identifying a current position of the self vehicle.

In addition, the position standardization unit 15*a* identifies position reliability to represent the accuracy of the current position of the self vehicle from accuracy information (for example, HDOP) included in information input the GPS sensor 11. In addition, the position reliability in the present embodiment increases when the accuracy of the current position is high, and decreases when the accuracy of the current position is low.

The learning control unit 15*b* associates, with road identification information (a link ID) representing a traveling road section sent out from the position standardization unit 15*a*, travel information of the traveling road section collected by each of the sensors carried by the self vehicle for memorizing in the storage medium 15*c*. In addition, when past travel information is memorized in the storage medium 15*c*, the average of the travel information based on the number of times of learning is calculated from past travel information memorized in the storage medium 15*c* and collected travel information, and the averaged value is learned as new travel information to be stored in the storage medium 15*c*. In addition, the travel information includes the vehicle information such as, for example, a vehicle speed, a power consumption amount, a fuel consumption amount, shift lever position information, accelerator opening information, the engine rotation number, and the brakes operation number as well as the road information such as a road incline, a road curvature and the like. In addition, the vehicle speed is calculated based on a vehicle speed signal sent out from the vehicle speed sensor 13 in the present embodiment, and the vehicle speed is memorized as travel information in the storage medium 15*c*.

The storage medium 15*c* is implemented as a nonvolatile memory such as a flash memory.

The destination setting unit 15*d* identifies the course from the departure place to the destination according to the operation of the user, and sends the information on the course from the departure place to the destination to the travel support unit 15*e*.

The travel support unit 15*e* outputs, according to a request from the light control unit 20 the hybrid control unit 21, and the vehicle speed control unit 22, the course information from the departure place to the destination sent from the destination setting unit 15*d* or the vehicle information stored in the storage medium 15*c*.

The control unit 15 is implemented as a computer which has a CPU, ROM, RAM, I/O, and the CPU executes various processing according to the program memorized in the ROM. In addition, the position standardization unit 15*a*, the learning control unit 15*b*, the destination setting unit 15*d* and the travel support unit 15*e* are realized as processing of the CPU of the control unit 15.

The communication control unit 15*f* is capable of conducting radio communication to an outside of the vehicle, and can perform two-way communication with the information center 3.

The information center 3 is implemented as a server having a database that stores information on traffic flow to represent traffic flow of every road section collected by the travel of probe cars 4.

Figure 3:
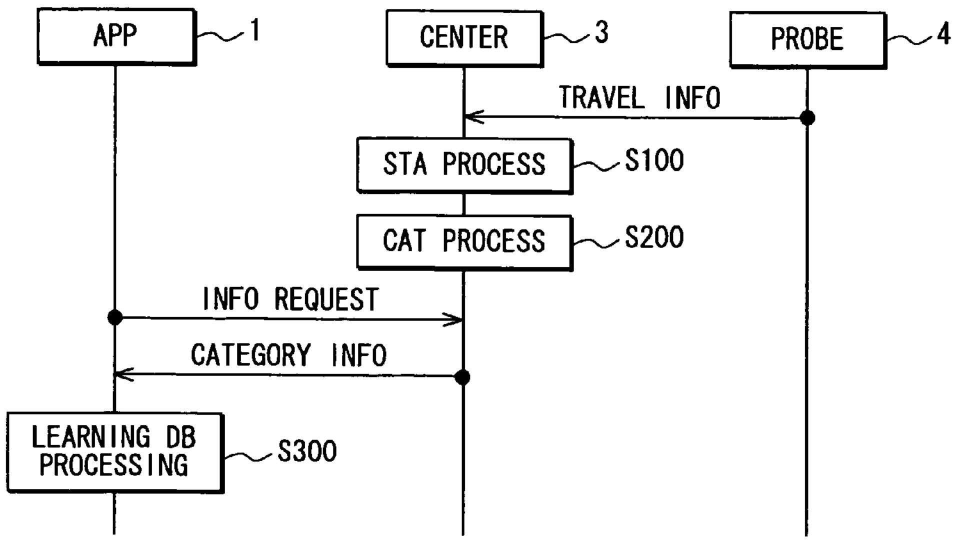
FIG. 3 shows a sequence chart showing processing of the travel information collection apparatus and an information center.

Statistical processing is performed, and processed information is stored in a database of the information center 3 as shown in FIG. 3 when the travel information collected by the travel of the probe cars 4 is received (S100). In addition, an average vehicle speed of each of the links is included in the travel information collected by the probe car 4 as information on the traffic flow to represent traffic flow. When the average vehicle speed is received from the probe cars 4, the average vehicle speed for every predetermined time (for example, for every 10 minutes) is calculated for each link, and the average vehicle speed is stored in the database of the information center 3 as shown in FIG. 4.

The information center 3 performs classification/categorization processing for the information on the traffic flow stored in the database next (S200). The classification of the travel information is performed to generate categorized information in plural categories of time slots, days of the week, and holidays according to the characteristics of the information on the traffic flow of each link stored in the database, and categorized information is stored in respectively different areas in the database.

Figures 4, 5, 6:
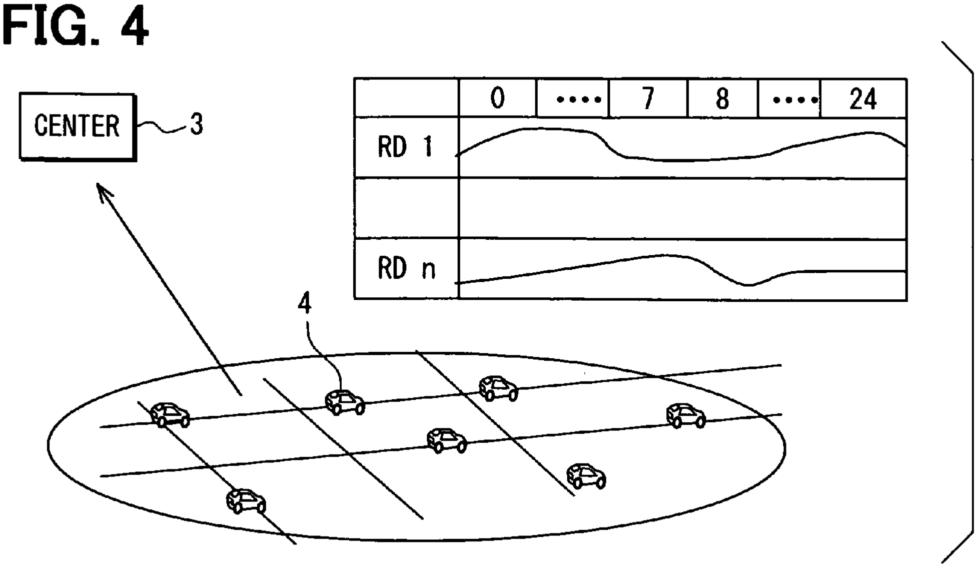
FIG. 4 shows an illustration of statistical processing of the information center.
FIG. 5 shows a diagram showing a structure of classification information.
FIG. 6 shows a diagram showing the structure of a learning database.

An example of the classification of the information is shown in FIG. 5. For example, when the average vehicle speed from 7:00 to 9:00 of a road 1 (link 1) is smaller than 20 kilometers per hour with the average vehicle speed for the rest of the hours (from 9:00 to 7:00) being equal to or greater than 20 kilometers per hour, the information is classified into two groups of 7-9 group and other hour (9-7) group. Likewise, for each of the roads (for each link n), plural groups are generated according to the characteristics of average vehicle speed. Further, according to categories of days of the week and holidays, the information is classified.

The control unit 15 (represented as APP (i.e., application) 1 in FIG. 3) in the present embodiment acquires information of classification from the information center 3 as shown in FIG. 3 when the travel information collection apparatus 1 is started for the first time or the apparatus 1 has operated at a predetermined maintenance timing, and performs learning database building process to build the learning database according to the classification information to have plural categories of time slots (S300).

The configuration of the learning database is shown in FIG. 6. The learning database has plural storages, that is, a storage that stores a reference value B set for each of road types, a storage that stores the number of travels times A being divided according to the degree of the separation or variance relative to the reference value B, a storage that stores statistical reliability C mentioned later, a storage that stores the travel information (i.e., the average vehicle speed) D collected by the travel of the self vehicle, and a storage that stores position reliability output from the position standardization unit 15*a*. In addition, the storage unit to store the number of travels times A is divided into 5 kilometer steps with reference to the reference value B that serves as a standard.

Each of these storages is classified into categorized of time slots, days of the week, and holidays according to a classification of classification information generated by the information center 3.

In the present embodiment, the travel information of each of the road sections collected by the travel of the vehicle is learned according to the classification of the learning database.

Figure 7:
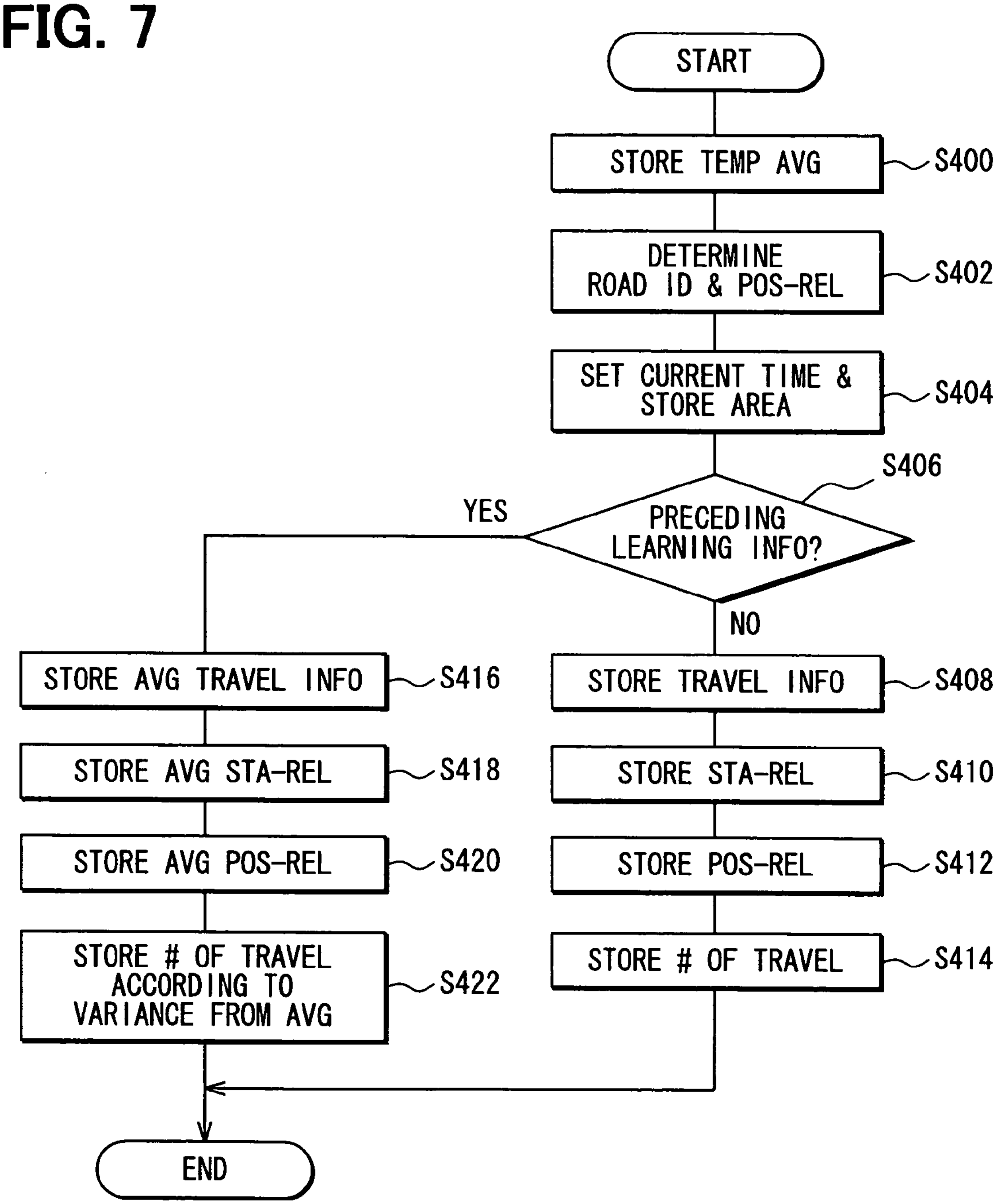
FIG. 7 shows a flowchart of a control unit of the travel information collection apparatus.

With reference to FIG. 7, processing of the control unit 15 of the travel information collection apparatus 1 is explained next. Every time the self vehicle arrives at a start point of the object link or at an end point, the control unit 15 carries out processing shown in FIG. 7.

First, the travel information is collected with each sensor carried by the self vehicle, and a temporary reference value according to the road type of the object link is memorized in the learning database (S400). More practically, the learning database memorizes the predetermined reference value B (for example, 40 kilometers per hour) which corresponds to the road type of the object link as shown in FIG. 8A.

The road identification information (link ID) and the position reliability of the object link are specified next (S402). In this case, the position reliability is specified by position standardization unit 15*a*.

Current time is specified next, and a destination (i.e., a store area) of the collected travel information is determined (S404). For example, in a case of 7:30 of Monday, the destination of the learning database is determined as an area of 7:00 to 9:00 of the weekday.

Then, the process determines whether there is learning information based on the fact that destination of the learning database already has memorized travel information (S406).

When the travel information is not memorized in the destination of the learning database, the determination of S406 becomes NO, and the travel information collected in the destination determined in S404 is memorized (S408). For example, the average vehicle speed (42 kilometers per hour) is memorized as the travel information in the destination determined in S404 as shown in FIG. 8A, when the object link is road 1 (RD 1) and the average vehicle speed of 42 kilometers per hour was collected as the travel information.

Then, statistical reliability is memorized (S410). More practically, according to the predetermined reference value and separation of the collected travel information therefrom, the statistical reliability to represent the degree of the unevenness of the collected travel information is identified, and the statistical reliability is, in association with the travel information, memorized in the storage of the statistical reliability of the learning database. The statistical reliability may set by employing unevenness of the travel information from the most frequent travel information instead of the separation from the reference value. More practically, if the travel information is largest in number in reference value +5 slot, the slot of reference value +5 is set as the standard and the unevenness is set accordingly. The statistical reliability in the present embodiment is represented as 0-100 scale, and that unevenness of the travel information is greater when the number of 0-100 scale is smaller. For example, the number of 100 is memorized in the storage of the statistical reliability of the learning database when the statistical reliability was specified as 100.

Then, position reliability is memorized (S412). For example, the number of 80 is memorized in the storage of the position reliability of the learning database in association with the collected travel information when position reliability of 80 was specified by the position standardization unit 15*a*.

The number of travels is memorized next (S414). For example, when the average vehicle speed of 42 kilometers per hour was collected as the travel information, the number of travels '1' is memorized in the storage of the average vehicle speed 40+5 kilometers slot, and the processing is finished.

Every time the self vehicle arrives at the start point of the object link or the end point in the way, the above processing is carried out, and the travel information is memorized in the learning database.

When the self vehicle travels the link which has memorized travel information in the learning database for the second time, the determination of S406 becomes YES, and the process performs averaging and memorizing of the collected travel information and the past travel information in the destination determined in S404 (S416). More practically, the average of the travel information according to the number of travels is calculated based on the collected travel information and the memorized travel information, and the averaged value of the travel information is stored in the destination determined in S404 as new travel information. As a result, the average vehicle speed (44 kilometers per hour) is stored in the above-described manner to the storage of the travel information of FIG. 8B.

Now, the statistical reliability is specified next, and the specified statistical reliability is averaged with the past reliability to be stored (S418). The average of the statistical reliability is calculated by averaging the specified statistical reliability and the memorized reliability according to the number of travels, and the calculated average is memorized in the destination determined in S404 as the new statistical reliability. As a result, the number 75 is stored in the storage of the statistical reliability of FIG. 8B.

The position reliability is memorized next (S420). More practically, the position reliability specified by the position standardization unit 15*a* and the position reliability that is already memorized are averaged one by one, and the calculated average of the position reliability is stored in the position reliability storage as a new position reliability. As a result, the number 77 is stored in the storage of the position reliability of FIG. 8B.

The number of travels is memorized next (S422). For example, when the average vehicle speed of 48 kilometers per hour was collected as the travel information, the number of travels '1' is memorized in the storage of an average vehicle speed 40+10 kilometers slot, and the processing is finished.

As described above, the learning database classified according to the characteristics of information of traffic flow stored in the database of the information center 3 is built to have plural time slot categories, and the classification of the learning database is used for collecting and learning the travel information.

The hybrid control unit 21, the light control unit 20 and the vehicle speed control unit 22 respectively transmit a sending request of the vehicle information to the travel information collection apparatus 1, and the travel information in response to the sending request sent out from the travel information collection apparatus 1 is used for the setting of the control targeted value for performing various control.

For example, the hybrid control unit 21 acquires a vehicle speed and a road incline in the course to the destination from the travel information collection apparatus 1, and creates a charge plan that suppresses the fuel consumption based on the information, and performs and the charge of the hybrid vehicle and an assist control based on the charge plan.

In addition, based on the road incline of the front road and the road curvature rate acquired from the travel information collection apparatus 1, the light control unit 20 changes the direction of the headlight suitably towards the road shape in front of the vehicle.

Further, the vehicle speed control unit 22 acquires the road incline of the front road and the road curvature rate from the travel information collection apparatus 1, and performs the vehicle speed control according to the road shape in front of the vehicle.

Furthermore, because the statistical reliability and the position reliability are associated with the travel information in the learning database, in-vehicle control units 20-22 can utilize highly reliable travel information selectively based on the statistical reliability and the position reliability, and the learning database can improve with accuracy of the control of each part of the vehicle.

Because the learning database is built to have plural time slot categories according to the characteristics of information on traffic flow stored in the database of the information center 3, and the classification of the learning database is used to learn the collected travel information, the collected travel information can be managed accurately.

In other words, for example, when the collected travel information is classified into one hour time slot categories, the information cannot be managed accurately because the first thirty minutes having a congested traffic flow and the second thirty minutes having a smooth traffic flow are combined into a single slot. However, if the characteristics of the traffic flow are used to define the time slot suitably, the collected travel information can be memorized in the storage medium accordingly, thereby enabling the accurate management of the collected travel information. In addition, the travel information memorized in the storage medium reflects the operational characteristics of the vehicle driver.

The present invention can be implemented in various forms as long as the implementation pertains to the scope of the invention.

For example, the travel information is collected for each link that defines a road section, and the information is memorized for each link in the storage medium in the above embodiment. However, the travel information may be collected by a segment unit for example, and may be memorized by the segment unit in the storage medium.

In addition, though, in the above embodiment, the learning database is built under classification according to not only the distinction of time slot but also the days of the week and holidays to learn the collected travel information accordingly, the learning database may be build without regard to the days of the week and holidays. That is, the learning database may be classified only according to the time slots.

In addition, though, the average vehicle speed at the time of the link passage is included in the travel information as information on the traffic flow in the above embodiment, and the classification of information is defined as the plural time slots according to the characteristics of the average vehicle speed, the link travel time for going through a link or the like may be, for example, included in the travel information as the traffic flow characteristics, and the classification of information may reflect the characteristics of the link travel time to have the plural time slots.

In addition, though a group of 7:00 to 9:00 and a group of 9:00 to 7:00, that is, two groups of one hour unit classification are shown in the above embodiment as shown in FIG. 5, the group may be formed as, for example, a group of 7:10 to 8:50 and a group of 8:50 to 7:10, that is, the groups of having a shorter time unit. By having the shorter time unit, the travel information can be more accurately managed.

In addition, though an average vehicle speed of less than 20 kilometers per hour group and an average vehicle speed of 20 kilometers per hour and over group are used to classify the travel information in two steps in the above embodiment, the travel information may be classified into three steps or more, that is, for example, a group of the average vehicle speed of less than 20 kilos, a group of the average vehicle speed between 20 and 40 kilos, and a group of the average vehicle speed of 40 kilos and over.

In addition, though, in the above embodiment, the information center 3 receives the information on traffic flow collected along the travel of probe cars 4 for storing the information in the database, the information on traffic flow stored in the database of the information center 3 may be derived from the other sources than the probe cars 4.

In addition, though, in the above embodiment, an example specifying the position reliability to represent the accuracy of the current position of the self vehicle based on accuracy information (for example, HDOP) included in information from the GPS sensor 11 is shown, the road map information of the map database having the map accuracy information of each area may be utilized for specifying the position reliability of each area.

In addition, the configuration in the above embodiment and conceptual claiming of the embodiment may be defined in the following manner. That is, a position standardization unit 15*a* is equivalent to a position detector, S400-S422 of FIG. 7 is equivalent to a storage control unit, S410 and S418 of FIG. 7 are equivalent to a statistical reliability storage unit, S412 and S420 of FIG. 7 are equivalent to a position reliability storage unit, and S300 is equivalent to a database building unit.

Such changes and modifications are to be understood as being within the scope of the present invention as defined by the appended claims.

What is claimed is:

1. A travel information collection apparatus equipped in a self vehicle, the apparatus comprising:

a position detector configured to determine a current position of the self vehicle and a traveling road section;

a storage control unit configured to store, in a storage unit, travel information of only the self vehicle collected for each of road sections along a travel of the self vehicle; and a database building unit configured to build a learn database of the travel information of only the self vehicle, the learn database having a plurality of time slot categories according to characteristics of traffic information acquired from a traffic information database of an information center that is external to the self vehicle, the characteristics of the traffic information being representative of traffic flow of a specific road section, the storage control unit is configured to provide the travel information of only the self vehicle to the database building unit according to the plurality of time slot categories of the learn database.

2. The apparatus of claim 1, wherein the travel information includes at least one of a vehicle speed, a power consumption, a fuel consumption amount, shift lever position information, acceleration opening information, an engine rotation number, a brake operation number, a road inclination, and a road curvature.

3. The apparatus of claim 1, wherein
the database building unit is configured to categorize the learn database by using days of a week and holidays.

4. The apparatus of claim 1, wherein
the information center is configured to generate categorized information having a plurality of time slot categories according to the traffic information characteristics in the traffic information database, and
the database building unit builds the learn database according to the categorized information after acquiring the categorized information from the information center.

5. The apparatus of claim 1, wherein
the storage control unit is configured to store a number of learning operations of the travel information to the storage unit,
the storage control unit is configured to calculate averaged travel information based on collected travel information and past travel information stored in the storage unit by using the number of learning operation, and
the storage control unit is configured to control the averaged travel information to be learned as new travel information according to the categories of the learn database.

6. The apparatus of claim 5 further comprising:
a statistical reliability storage unit configured to store, to the storage unit, collected travel information in association with statistical reliability after determining the statistical reliability that represents a scatter of the collected travel information from a predetermined standard.

7. The apparatus of claim 6, wherein
the statistical reliability storage unit is configured to calculate an averaged value of the statistical reliability by using the number of learning operations based on the statistical reliability of the collected travel information and past travel information stored in the storage unit, and
the statistical reliability storage unit is configured to store the averaged value of the statistical reliability as new statistical reliability to the storage unit.

8. The apparatus of claim 1 further comprising:
a position reliability storage unit is configured to store, to the storage unit, position reliability in association with the collected travel information after determining the position reliability that represents an accuracy of the current position of the self vehicle.

9. The apparatus of claim 8, wherein
the position reliability storage unit is configured to calculate an average value of the position reliability by using the number of learning operation based on the position reliability of the collected travel information and past travel information stored in the storage unit, and
the position reliability storage unit is configured to store, to the storage unit, the average value of the position reliability as new position reliability.

10. A method for learning travel information of a self vehicle, the method comprising:
determining a current position of the self vehicle and a traveling road section;
storing, to a storage unit, travel information of only the self vehicle collected for each of road sections along a travel of the self vehicle;
acquiring a base classification of traffic information from a traffic information database from an external information center that is arranged to provide characteristic information of traffic flow of each of the road sections in correlation with a plurality of time slot categories;
building a database, using a database building unit equipped in the self vehicle, the database having the plurality of time slots categories according to the base classification of traffic information with the collected travel information; and
controlling the collected travel information of only the self vehicle to be learned according to categorization of the learn database.

11. A travel information collection apparatus equipped in a self vehicle, the apparatus comprising:
a position detector configured to determine a current position of the self vehicle and a traveling road section;
a database building unit configured to build a learn database having a plurality of time slot categories according to a classification of travel information from a travel information database of an external information center, the classification of travel information represents a traffic flow of a traveling road section, the database building unit is configured to first store the classification of travel information from the information center, and build the learn database according to the classification of travel information with travel information of only the self vehicle; and
a storage control unit configured to store, in a storage unit, the travel information of only the self vehicle collected for each of road sections along a travel of the self vehicle, the storage control unit is configured to provide the database building unit with the travel information according to the classification of travel information of the learn database.

12. The apparatus of claim 1, wherein the information center external to the self vehicle is configured to receive travel information of at least one of the road sections from a plurality of probe cars, and performs statistic processing on the travel information provided by the probe cars to generate the characteristics of traffic information that represents the traffic flow of the at least one of the road sections.

* * * * *

UNITED STATES PATENT AND TRADEMARK OFFICE

CERTIFICATE OF CORRECTION

PATENT NO. : 8,666,593 B2
APPLICATION NO. : 12/148805
DATED : March 4, 2014
INVENTOR(S) : Kazunao Yamada It is certified that error appears in the above-identified patent and that said Letters Patent is hereby corrected as shown below:

In the Title Page:

Item (30) Foreign Application Priority Data "Apr. 25, 1920" should be
--Apr. 25, 2007--.

Signed and Sealed this
Seventeenth Day of June, 2014

Michelle K. Lee
*Deputy Director of the United States Patent and Trademark Office*